United States Patent [19]
Hashimoto

[11] Patent Number: 4,531,779
[45] Date of Patent: Jul. 30, 1985

[54] AUTOMOTIVE SEAT WITH LUMBAR SUPPORT

[75] Inventor: Yuji Hashimoto, Okayama, Japan

[73] Assignee: Namba Press Works Co., Ltd., Japan

[21] Appl. No.: 460,594

[22] Filed: Jan. 24, 1983

[51] Int. Cl.³ .............................................. A47C 7/46
[52] U.S. Cl. .................................................. 297/284
[58] Field of Search ................ 297/61, 284, 410, 460; 248/421

[56] References Cited

U.S. PATENT DOCUMENTS

| | | |
|---|---|---|
| 2,685,327 | 8/1954 | Pitman . |
| 3,121,592 | 2/1964 | Anderson . |
| 3,137,524 | 6/1964 | Chancellor, Jr. ................ 297/284 |
| 3,288,525 | 11/1966 | Cerf . |
| 3,880,463 | 4/1975 | Shephard et al. . |
| 3,890,000 | 6/1975 | Easley . |
| 3,929,374 | 12/1975 | Hogan et al. . |
| 3,938,858 | 2/1976 | Drabert et al. . |
| 3,948,558 | 4/1976 | Obermeier et al. . |
| 4,019,777 | 4/1977 | Hayashi . |
| 4,040,661 | 8/1977 | Hogan et al. ....................... 297/284 |
| 4,148,522 | 4/1979 | Sakurada et al. . |
| 4,155,592 | 5/1979 | Tsuda et al. . |
| 4,156,544 | 5/1979 | Swenson et al. . |
| 4,182,533 | 1/1980 | Arnelt et al. ....................... 297/284 |
| 4,239,282 | 12/1980 | White . |
| 4,313,637 | 2/1982 | Barley ................................ 297/284 |
| 4,313,640 | 2/1982 | Trotman et al. . |
| 4,353,595 | 10/1982 | Kaneko et al. ................ 297/61 X |

FOREIGN PATENT DOCUMENTS

| | | | |
|---|---|---|---|
| 140021 | 2/1980 | Fed. Rep. of Germany ...... 297/284 |
| 2271 | of 1862 | United Kingdom ................ 248/421 |
| 2055711 | 3/1981 | United Kingdom . |

Primary Examiner—William E. Lyddane
Assistant Examiner—Peter R. Brown
Attorney, Agent, or Firm—Harness, Dickey & Pierce

[57] ABSTRACT

An automotive or similar type vehicle seat comprising a seat back having an adjustable central portion which may be selectively adjustably positioned to minimize driver fatigue. The adjustable area is actuable upon rotation of an adjustment knob which controls rotation of a shaft which is connected via suitable linkages to a pivotal support mechanism for pivotably adjusting the central portion of the seat back.

21 Claims, 4 Drawing Figures

AUTOMOTIVE SEAT WITH LUMBAR SUPPORT

BACKGROUND OF THE INVENTION

This invention relates in general to vehicular seats which help the driver and/or passenger feel more comfort and less fatigue. In particular, this invention relates to automotive seats with a mobile seat back which is adjustable to the contours of the driver's body, and which thereby reduces fatigue of the driver and results in a more comfortable ride.

In general, automotive seats have been designed to minimize the fatigue of the driver during driving, i.e., the seat backs have been designed with optimum stress-strain relationship in mind. It has been reported that positioning a vehicle seat back in the position shown in FIG. 4 such that the maximum stress range (the stress of 60 g/cm$^2$ range in the figure) is located at the second and third lumbar vertebra gives a driver minimum fatigue and maximum comfort during driving. However, such seat back designs fit the body contour of an average driver, and depending upon body contours of individual drivers and the reclining angle of the particular seat, deviation from the optimum stress distribution takes place, thus increasing fatigue and discomfort of the driver. In addition, even if the driver sits in the optimum seating configuration, sitting in the same position for prolonged time causes constant stress on the same parts of the body, which often leads to fatigue and discomfort to the driver.

One generally satisfactory solution to the problem of overcoming the deficiencies of conventional vehicular seats is disclosed in U.S. patent application entitled Seat for Vehicle, Ser. No. 323,662, filed Nov. 20, 1981 and assigned to the assignee of the present invention. While the vehicular seat disclosed therein is quite successful in fulfilling its objectives, further comfort is constantly being strived for.

BRIEF SUMMARY OF THE INVENTION

The invention comprises an improved vehicle seat having a seat portion and a back portion and an adjustable lumbar support assembly for reducing back fatigue of the seat occupant. The overall construction and design of the vehicular seat of this invention is shown in FIG. 1. The seat back in the invention is made up of two parts, namely, one part supported by the main seat back frame and being relatively fixed, and the other part being mobile with its movement controlled by an adjustment knob. The separation of the mobile seat back from the main seat back frame is most pronounced at the lower part of the mobile cushion. Thus the discontinuity between mobile cushion and the seat back frame is least pronounced at the upper part of the cushion. The has been found to add greatly to the comfort of the seat. When the mobile seat back comes forward toward the back of the driver (FIG. 1), the maximum stress range of lumbar vertebra goes upward, and when the mobile seat back goes backward away from the back of the driver, the maximum stress range goes downward. Consequently, the deviation from the optimum stress ranges due to the difference in body contours of drivers can be corrected by adjusting the mobile seat back.

The lumbar support assembly comprises a support frame having upper and lower portions pivotally secured to the seat back portion for movement about a generally horizontal axis adjacent the upper portion of the support frame. Carried on the support frame is a cushion designed to engage the lumbar region of the seat occupant during use. A fulcrum disposed in fixed relation to the seat back portion pivotally secures a lever generally at the center thereof. The lever in turn is coupled to the lower portion of the support frame so that pivotal movement of the lever about the fulcrum causes the lower or bottom portion of the lumbar engaging cushion to move inwardly or outwardly with respect to the plane of the seat back. A manually actuable threaded shaft is interconnected with the lever by means of linkage for translating rotating movement of the shaft into translating movement of an axle, which in turn causes the lever to pivot about the fulcrum.

It is a general object of the invention to provide a new and improved vehicular seat which overcomes or reduces the deficiencies of conventional vehicular seats described above and which improves upon the vehicular seat disclosed in U.S. patent application Ser. No. 323,662. By incorporating an adjustable, mobile seat back in a vehicular seat, a driver can freely select the seat back position and adjust the seat back to his own body contours.

Another objective is to enable the driver to adjust or correct the body stress distribution to specific seating positions. When driving congested streets or driving minimum angle of reclining, the body stress becomes concentrated at upper part of vertebra, thus deviating from the optimum stress distribution.

Another object is to provide a driver during long distance driving with more comfort and less fatigue by enabling occasional adjusting and readjusting of the mobile seat back, which avoids the constant stress on the same part of the body. A driver suffering fatigue due to long hours of driving may take corrective measures via means for adjusting seating positions; for example, by moving the upper part of the mobile seat between back and forward, the driver during long hours of driving can adjust the body stress on his back, thus contributing to reduction of fatigue.

The objects described above can be achieved with the seat in the invention. The driver in this seat can choose seating position and adjust the mobile seat back in order to reduce fatigue during driving.

Other objects, features, and advantages of the present invention will become apparent from the subsequent description and the appended claims, taken in conjunction with the accompanying drawing, in which:

DETAILED DESCRIPTION OF THE DRAWING

DETAILED DESCRIPTION OF THE PREFERRED EMBODIMENTS

From the drawings, it will be seen that the automotive seat of the invention has a seat back consisting of two primary parts, namely, the upper part 1 and the lower mobile cushion part 2. Bolsters 3 are fixed to he upper stationary part 1. In order to move the mobile part of the seat back, a knob or switch 4 is installed, as shown in FIG. 4.

Figure 4:
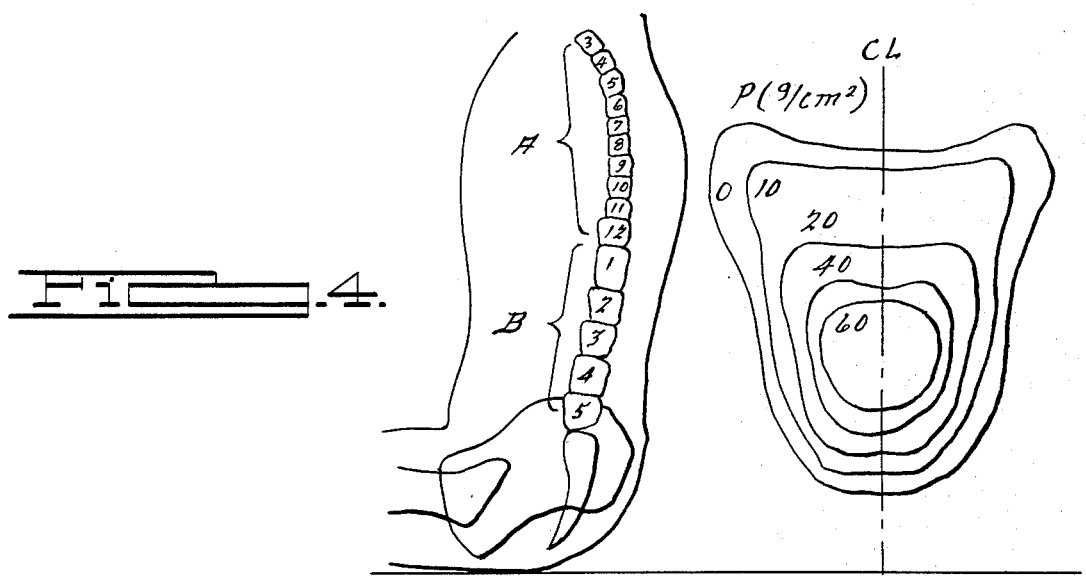
FIG. 4 is a schematic and graphic body stress distribution-fatigue analysis.

FIG. 4 shows the body stress distribution which results in minimum fatigue. Body stress distribution is dependent upon the contours of individual driver's body, and therefore, in order to achieve the body stress ranges (the areas of 40 g/cm² or more in FIG. 4) should be separated from whole seat back and should be made to move independently and continuously so that the driver can achieve the optimum body stress distribution with symmetry in respect to the back seat.

Figure 1:
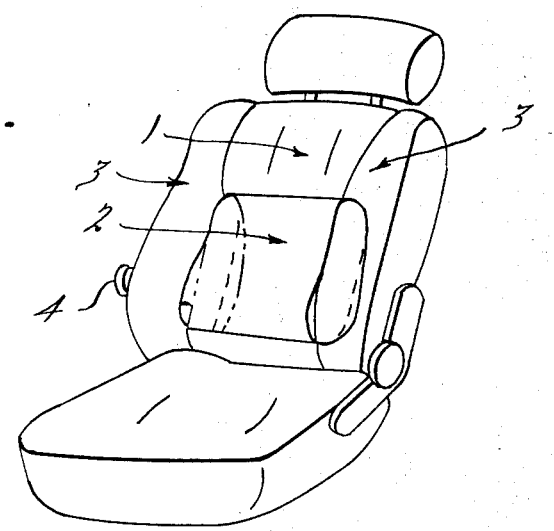
FIG. 1 is an elevated perspective view of a seat with the mobile seat back of the present invention.
Figure 2:
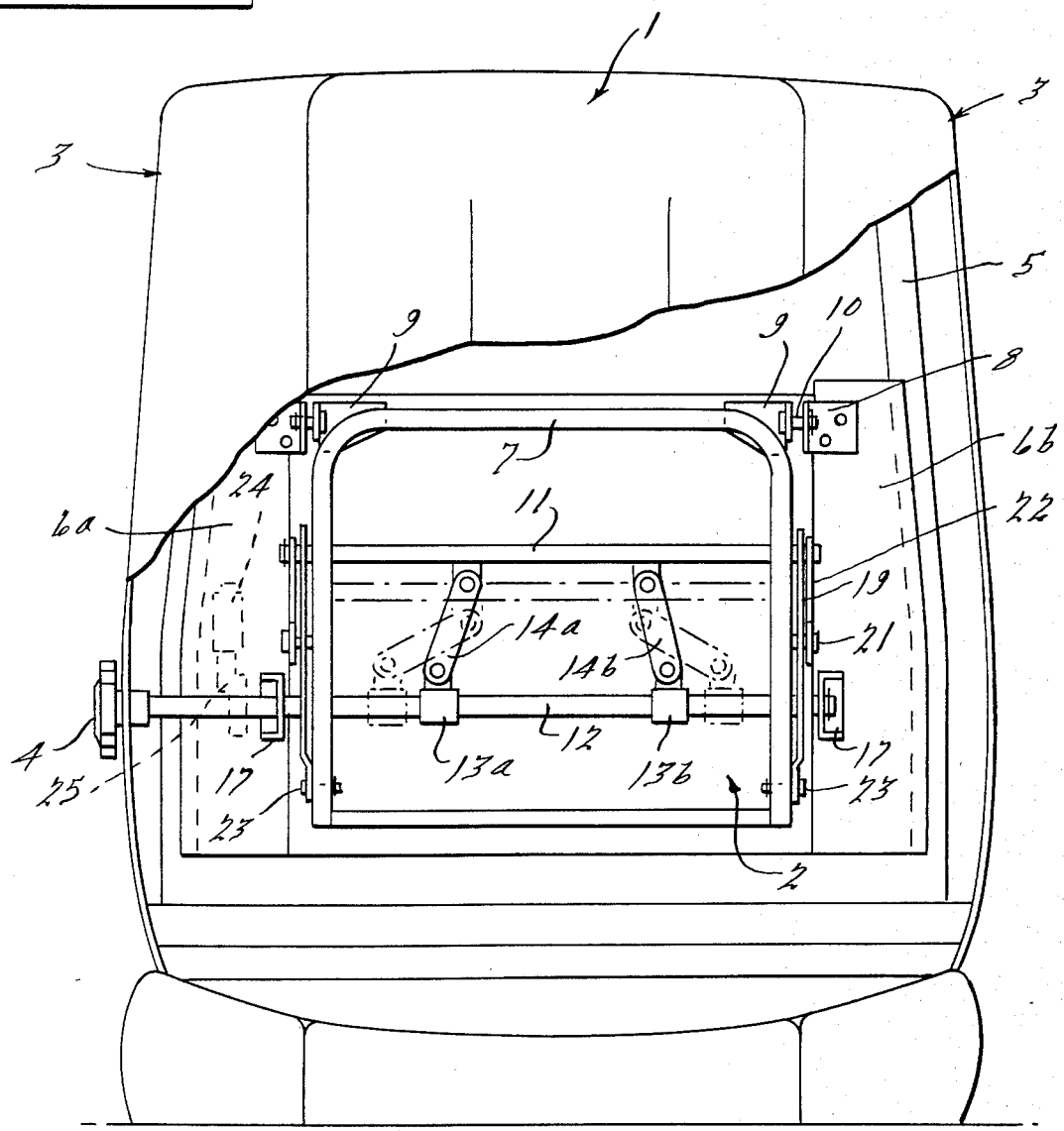
FIG. 2 is a partially broken away view of the seat of the present invention.
Figure 3:
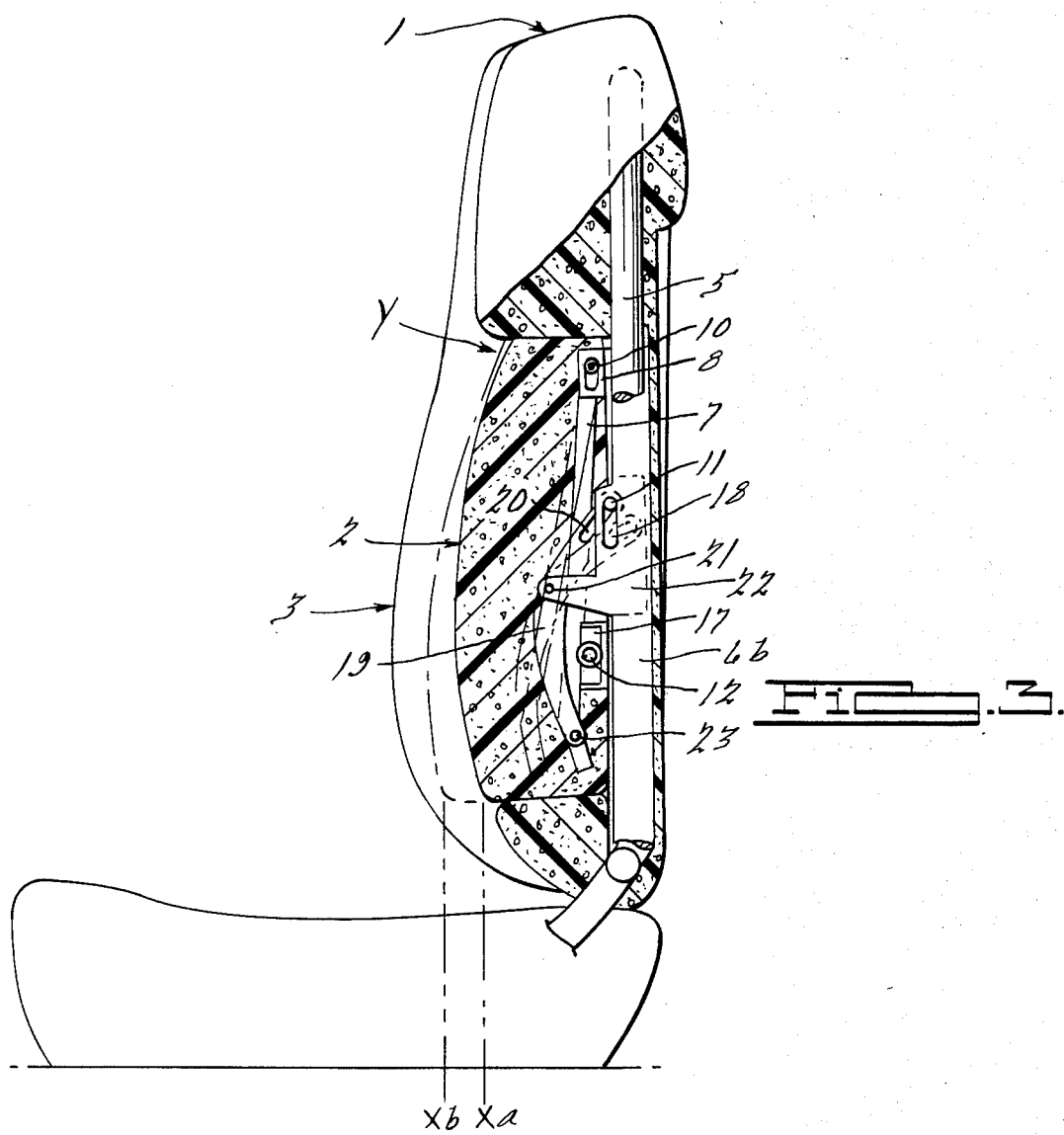
FIG. 3 is a longitudinal cross-sectional view of the seat back taken along the line of body contour of a driver.

The seat back of the invention is constructed as shown in FIGS. 2 and 3. Tubular frame 5 supports the whole seat back and bolster frames 6a and 6b with elastomeric foam, such as polyurethane foam, and constitutes the upper stationary seat back part. The lower mobile cushion 2 of the seat back is constructed in such a way that the driver can achieve the optimum stress distribution by adjusting the angle of the lower, mobile part of the seat back. The lower mobile cushion 2 is attached to or carried by a generally rectangular support frame 7 which is pivotaly secured along the upper end thereof by means of angle brackets 8 disposed on bolster frames 6a and 6b, support brackets 9 and hinge pins 10. Angle brackets 8 include a long hole 11 arranged to permit upward and downward sliding motion of pin 10 and bracket 9 generally in a plane parallel to the tubular frame 5. The invention further comprises a fulcrum or pin 21 carried or disposed in fixed relation to the seat back portion by means of elongated brackets 22 disposed on bolster frames 6a and 6b. Pivotally secured about each fulcrum pin 21 is a crescent-shaped lever 19. The mid section of each lever 19 is pivotal about the respective fulcrum pin 21, while the lower end thereof is secured for pivotal movement with respect to the bottom of frame 7, as with pins 23. The upper end of each lever 19 includes an elongated slot 20. A linkage axle 11 is received in slots 20 for sliding and rotating movement therein. Axle 11 is further carried for sliding movement in a second pair of elongated slots 18 formed in bracket members 22. It will be seen that when axle 11 moves upwardly, the seat back frame 7 rotates about the generally horizontal axis passing through pins 10 due to forces exerted through lever 19 about fulcrum pin 21, whereby the lower part of the mobile cushion 2 moves laterally inwardly towards tubular frame 5. On the other hand, when the axle 11 moves downwardly, the seat back frame 7 rotates about the axis through pin 10, whereby the lower part of the mobile cushion moves laterally outwardly away from tubular frame 5. Thus it will be seen that the mobile cushion is adjustable so that the lower portion thereof is movable between retracted position Xa and extended Xb. At the same time it will be seen that the upper portion of mobile seat cushion 2, as at Y, remains relatively stationary with respect to the tubular frame 5. It has been found that this makes for a more comfortable seat by providing for very little, if any, discontinuity or lateral movement of the lumbar support cushion at its upper end Y. It will be understood that some would find any significant discontinuity between the upper seat portion 1 and the upper portion of mobile cushion 2 to be quite uncomfortable. It will further be appreciated that the elongated slots 18 and 20 and long hole 16 permit a certain amount of sliding movement of the entire lumbar support assembly generally in a plane parallel to the tubular frame 5. Such movement permits the lumbar support cushion to move in the trajectory shown in FIG. 3, within the confines of the space defined by the upper seat portion 1.

In order to move the axle 11 up and down, an adjusting shaft or axle 12 is introduced at the back of the mobile seat back frame 7. Both ends of the adjusting axle 12 are supported by holes in the respective side walls of supporting brackets 17 which are secured to bolster frames 6a and 6b. The adjusting axle 12 has reverse threads at its opposite ends, and includes thread holders 13a and 13b which have threads with the same pitch as the threads on the axle 12. Rods 14a and 14b connect the thread holders 13a and 13b and the axle 11. An adjusting knob 4 is attached at the end of the adjusting axle 12. By rotating the adjusting knob 4, the thread holders 13a and 13b move horizontally and this movement causes the up-down movement of the axle 11 through the joint rods 14a and 14b. Thus, the driver can move the mobile seat back by rotating the adjusting knob 4.

As shown in FIGS. 2 and 3, the mechanism for moving the mobile seat back is effectively contained in narrow space within the seat; yet this mechanism exhibits strong enough force to move the mobile seat back overcoming the stress caused by the driver's back. Other types of mechanisms for adjusting the mobile seat back in the invention such as gears, cams, crankshaft or electronic motors can also be conceivable within the scope of the invention. Towards this end FIG. 2 illustrates the use of optiional drive motor 24 coupled through gears 25 to axle 12.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. In a vehicle seat comprising a seat portion and a seat back portion, the improvement comprising:
   an adjustable lumbar support assembly for reducing back fatigue of the seat occupant, said lumbar support assembly comprising
   a support frame having upper and lower portions, the upper portion of said support frame being pivotally secured to said seat back portion for rotational movement about a generally horizontal fixed axis adjacent said upper portion;
   lumbar engaging cushion carried on said support frame and having an upper portion generally flush with said seat back portion;
   fulcrum means disposed on said seat back portion;
   lever means pivotal about said fulcrum and coupled to said lower portion of said frame;
   manually actuable means for effecting pivotal movement of said lever means thereby altering the angular relation of said cushion with respect to said seat back portion;
   pin and slot means disposed on said seat back portion and on said lever means opposite said fulcrum for slidably securing said support frame to said seat back portion; and
   wherein said support frame is slidably secured by said pin and slot means to said seat back portion for translation with respect to said horizontal axis when said lever means is pivoted about said fulcrum, thereby allowing said cushion to shift upwardly and downwardly as the angular relation of said cushion is adjusted.

2. The invention as set forth in claim 1 further comprising first pin means carried on said seat back portion in alignment with said horizontal axis and first slotted bracket means disposed on said support frame and adapted to slidably and pivotally receive said first pin means.

3. The invention as set forth in claim 1 wherein said manually actuable means includes actuating shaft means and in adjustment knob for manually rotating said actuating shaft means.

4. The invention as set forth in claim 3 wherein said actuating shaft means comprises external thread means and linkage means operatively interconnecting said shaft means with said support frame.

5. The invention as set forth in claim 4 wherein said actuating shaft means comprises first and second threaded areas and linkage means cooperable with said threaded areas in a manner so as to move in opposite directions upon rotation of said actuating shaft means.

6. The invention as set forth in claim 3 wherein said manually actuable means comprises axle means coupled to said lever means and linkage means coupled to said axle means and to said actuating shaft means for converting rotary movement of said actuating shaft means into pivotal movement of said lever means.

7. The invention as set forth in claim 6 further comprising seat frame means defining a first slotted opening and wherein said axle means is carried in said first slotted opening.

8. The invention as set forth in claim 7 wherein said lever means includes second slotted opening for receiving said axle means.

9. The invention as set forth in claim 7 wherein said fulcrum means is carried on said seat frame means.

10. The invention as set forth in claim 1 wherein said lever means is crescent-shaped.

11. A lumbar support assembly for use in conjunction with a vehicle seat having a seat back portion including seat back frame, the lumbar support assembly comprising:
    frame means carried on said seat back frame for rotation about a generally horizontal axis and having lumbar engaging cushion disposed thereon;
    fulcrum means fixedly secured to said seat back frame projecting outwardly from the plane of said seat back frame;
    lever means pivotal about said fulcrum means having a first end thereof operatively connected to said frame means and a second end thereof defining a first slotted opening;
    axle means movably carried on said seat back frame for limited back and forth movement in a direction generally along said seat back frame and slidably engaged with said first slotted opening; and
    manually actuable means carried by said seat back frame for effecting reciprocation of said axle means thereby altering the angular relation of said lumbar engaging cushion with respect to said seat back portion.

12. The invention as set forth in claim 11 further comprising second frame means disposed on said seat back frame, said second frame means defining said fulcrum means and having a second slotted opening for slidably receiving said axle means, said axle means being movably carried in said second slotted opening for limited back and forth movement in a direction generally along said seat back frame.

13. The invention as set forth in claim 11 further comprising second frame means disposed on said seat back frame having a third slotted opening and pin means coupled to said frame means in alignment with said horizontal axis and slidably carried within said third slotted opening.

14. The invention as set forth in claim 11 wherein said lever means is crescent-shaped.

15. The invention as set forth in claim 11 further comprising a second pin means for coupling said first end of said fulcrum means to said frame means.

16. The invention as set forth in claim 11 wherein said manually actuable means includes actuating shaft means and an adjustment knob for manually rotating said actuating shaft means.

17. The invention as set forth in claim 16 wherein said actuating shaft means comprises external thread means and linkage means operatively interconnecting said shaft means with said support frame.

18. The invention as set forth in claim 17 wherein said actuating shaft means comprises first and second threaded areas and linkage means cooperable with said threaded areas in a manner so as to move in opposite directions upon rotation of said actuating shaft means.

19. In a vehicle seat comprising a seat portion and a seat back portion, the improvement comprising:
    an adjustable lumbar support assembly for reducing back fatigue of the seat occupant, said lumbar support assembly comprising
    a support frame having upper and lower portions, said support frame being pivotally secured to said seat back portion for movement about a generally horizontal axis adjacent said upper portion;
    lumbar engaging cushion carried on said support frame;
    fulcrum means disposed on said seat back portion;
    lever means pivotal about said fulcrum and coupled to said lower portion of said frame;
    manually actuable means for effecting pivotal movement of said lever means thereby altering the angular relation of said cushion with respect to said seat back portion;
    wherein said manually actuable means includes actuating shaft means and an adjustment knob for manually rotating said actuating shaft means;
    wherein said manually actuable means comprises axle means coupled to said lever means and linkage means coupled to said axle means and to said actuating shaft means for converting rotary movement of said actuating shaft means into pivotal movement of said lever means; and
    further comprising seat frame means defining a first slotted opening and wherein said axle means is carried in said first slotted opening.

20. The invention as set forth in claim 19 wherein said lever means includes second slotted opening for receiving said axle means.

21. The invention as set forth in claim 19 wherein said fulcrum means is carried on said seat frame means.

* * * * *

UNITED STATES PATENT AND TRADEMARK OFFICE
CERTIFICATE OF CORRECTION

PATENT NO. : 4,531,779

DATED : July 30, 1985

INVENTOR(S) : Yuji Hashimoto

It is certified that error appears in the above-identified patent and that said Letters Patent is hereby corrected as shown below:

Column 1, line 54 - "The" should be --This--

Column 2, line 67 - "he" should be --the--

Column 3, line 22 - "pivotaly" should be --pivotally--

Column 4, line 29 - "optiional" should be --optional--

Column 5, line 9 - "in" should be --an--

Signed and Sealed this

Twenty-fifth Day of February 1986

[SEAL]

Attest:

DONALD J. QUIGG

Attesting Officer

Commissioner of Patents and Trademarks